US005777995A

United States Patent [19]

Chas Alonso et al.

[11] Patent Number: 5,777,995
[45] Date of Patent: Jul. 7, 1998

[54] TRANSLATOR CHIP FOR A WIDEBAND NETWORK

[75] Inventors: Pedro Luis Chas Alonso; Luis Antonio Merayo Fernandez; Ana Altadill Arregui; Jose Manuel Suarez Martel; Ignacio Carretero, all of Madrid, Spain

[73] Assignee: Telefonica De España, S.A., Madrid, Spain

[21] Appl. No.: 815,998

[22] Filed: Mar. 10, 1997

Related U.S. Application Data

[63] Continuation of Ser. No. 419,927, Apr. 11, 1995, abandoned.

[30] Foreign Application Priority Data

Apr. 19, 1994 [ES] Spain ......................... 9400814

[51] Int. Cl.$^6$ ............... H04L 12/28; H04L 12/56
[52] U.S. Cl. ............... 370/395; 370/218; 370/473; 370/905; 326/62; 326/78; 379/289; 395/705
[58] Field of Search ............... 370/395, 489, 370/473, 241, 352, 218, 399, 234, 905; 326/62, 78; 379/289; 395/705

[56] References Cited

U.S. PATENT DOCUMENTS

| | | | |
|---|---|---|---|
| 4,792,899 | 12/1988 | Miller | 323/317 |
| 5,379,297 | 1/1995 | Glover et al. | 370/234 |
| 5,422,848 | 6/1995 | Jones et al. | 365/189.05 |

*Primary Examiner*—Wellington Chin
*Assistant Examiner*—Melissa Kay Carman
*Attorney, Agent, or Firm*—Reid & Priest LLP

[57] ABSTRACT

A translator in an element of a wideband network transforms a format restored by a CCITT information cell into other predetermined formats. It performs this function by inserting cells from a microprocessor into network data flow in asynchronous transfer mode (ATM) and extracting from the network data flow cells addressed to the microprocessor. The translator includes an input portion for receiving input data cells from the network data flow and for modifying a header of cells in the input data so as to adapt them to perform functions in the ATM layer. Preferably, the translator is implemented as an integrated circuit which serves as an interface between the network and the microprocessor, and which configures and manages asynchronous transfer mode multiplexer functions.

12 Claims, 1 Drawing Sheet

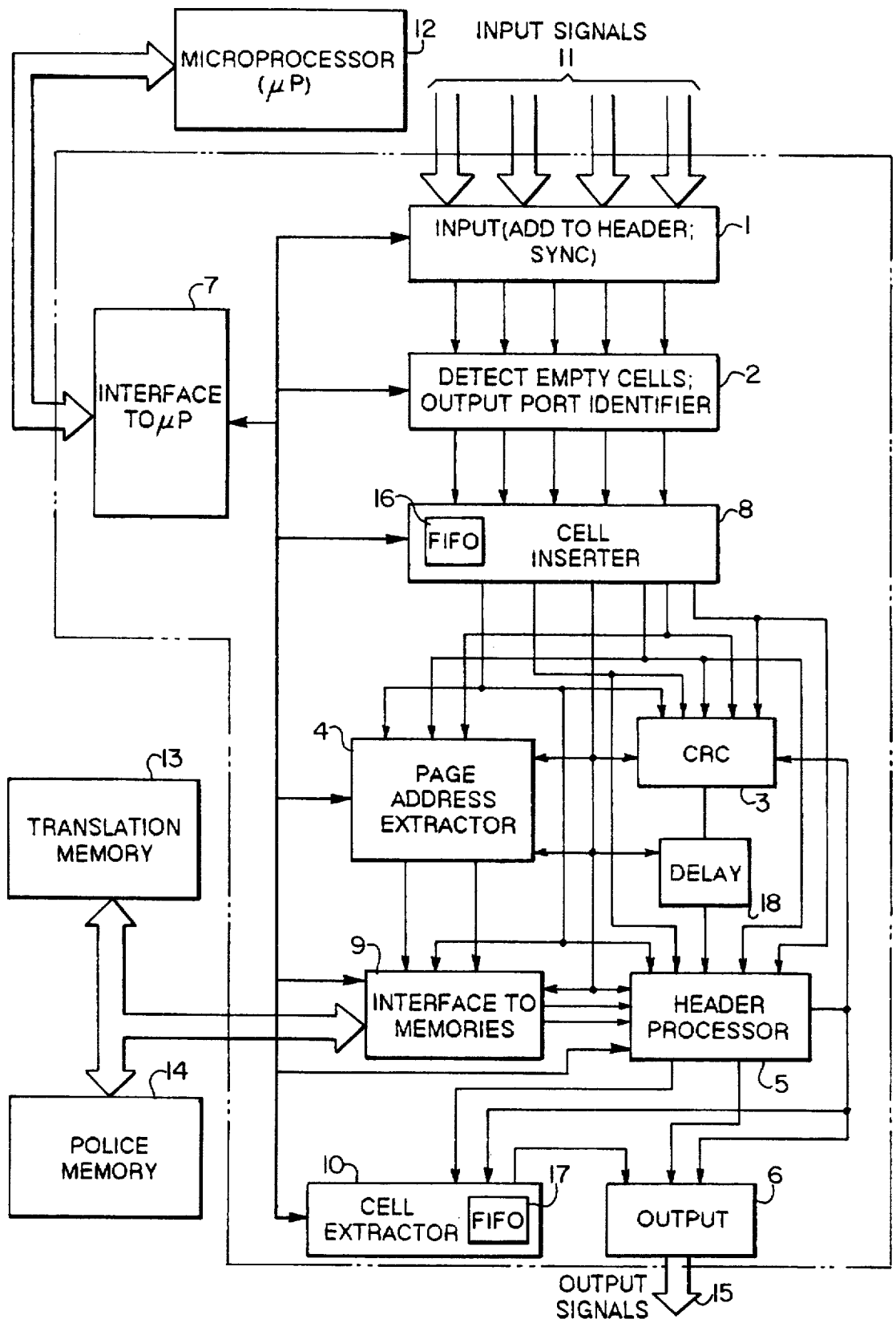

TRANSLATOR CHIP FOR A WIDEBAND NETWORK

This is a file wrapper continuation of U.S. application Ser. No. 08/419,924 filed Apr. 11, 1995, now abandoned.

BACKGROUND OF THE INVENTION

The present specification refers to a patent of invention relating to a translator chip or integrated circuit for a wideband network, the main function of which is to transform the format; restored by the information cell CCITT, to adapt it to one prearranged, verifying or generating the control indicator by cyclic redundancy of the cells indicated by the programming.

At the same time, the translator chip for a wideband network discards the cells not admitted by the integrated circuit acting as a police, watching that the band width should be the adequate one to the transmission, and, in turn, inserts and extracts cells from or towards the microprocessor in a data flow in asynchronous transfer mode (ATM), achieving, with these operations, to perform the necessary functions of the ATM layer, or asynchronous transfer mode on the wideband network, with no loss of information in any of the operations, since an error control is performed.

1. Field of the Invention

This invention applies to the telecommunications field, exactly forming a part of wideband communication systems in a digital network of integrated services.

2. Related Art

The processing of cells with format restored by the CCITT, at high transmission speeds,presents, in the steps of information control and routing of same, problems in adapting headers and information to the circumstances required by the network, especially at the moment of implementing the necessary functions for a correct addressing, with no loss of information in the layer of asynchronous transfer mode (ATM).

The solution to these difficulties rests on treating the cells in the routing processing, so that, by inserting the proper information, they can be multiplexed, and, with this new format, to perform the control and routing of the cells.

For it, it is necessary to insert into the data flow in asynchronous transfer mode, a component capable of transforming the restored format into other adequate to the network, and, also, including the necessary control and routing functions.

Nevertheless, until now nothing is know by the applicant about the existence of an invention gathering the features pointed out as suitable for carrying out these tasks.

SUMMARY OF THE INVENTION

The translator chip or integrated circuit for a wideband network as proposed by the invention constitutes per se an evident novelty within the field in which it is incorporated, since it is able to transform the format restored by the information cell CCITT into other prearranged format, by inserting the cells from of a microprocessor into the data flow in asynchronous transfer mode, and extracting from this flow the cells sent to the micro-processor, verifying at the same time and generating a control by cyclic redundancy of the cells indicated in the programming.

In a more definite way, the translator chip or integrated circuit for a wideband network of the invention is so shaped that for performing its functions, the integration of the circuit includes the following functional modules, namely:

Input step.
Detector of empty cells and filter IES
Step of control calculus.
Extractor of page address.
Header processor.
Delay step.
Output step.
Interface with microprocessor.
Insert step.
Interface of external memories.
Extraction step.

The first seven mentioned modules, that is to say, the input; step, the detector of empty cells and filter IES (output port identifier), the step of control calculus, the extractor of page address, the header processor, the delay step and the output step operate basically on the data flow in asynchronous transfer mode crossing them over, while the last four modules, that is to say, the interface with microprocessor, the insert step, the interface of external memories and the extraction step carry out interface functions with a microprocessor and the translation and police external memories.

The function of the input step is to convert the format of the cell from a restored state to that required by the wideband network into a data flow in asynchronous transfer mode with a speed on the order of 800 Mbits/s, and, for it, it adds to the cell header a new field, so-called label, which does not carry any significant information in this step, since this information will be added to in later steps of the circuit.

The frequency adaptation is performed in this input step, by multiplexing the input signals and, due to the fact that each has its own clock signals, cell synchronism and signal of empty cell, adapting this information to generate a single output signal including incoming signals.

The detecting step of empty cells and IES filter detects the existing empty cells in the data flow in asynchronous transfer mode, received from the preceding step, eliminating those cells not transporting in their header the value of the Element Identificator, terminator of output interface (IES) expected.

The insert step introduces cells from the microprocessor in existing voids in the data flow in asynchronous transfer mode, coming from the detecting step of empty cells.

The cells to be introduced are stored in an internal FIFO memory waiting for a command from the microprocessor, which is made when it detects an empty cell.

The extractor of page address and circuit reserved obtains the main part of the access address to the external RAM memories, and for it, it has an extraction mask composed of an assembly of registers starting from which the information corresponding to the base address is obtained.

The above mentioned step distinguishes between cells exclusively addressed to the microprocessor and cells which are not, there being not necessary to modify the header of those cells being exclusively addressed to the microprocessor.

The module of control calculus by cyclic redundancy generates or verifies said control in the cells indicated by the appropiate programming, and in the case of cells coming from the micro-processor, a control by cyclic redundancy is always generated, and in those addressed to same, it is always checked.

The step of header processor modifies the cell header, by assigning it new labels in accordance with the read performed by the translation RAM memory.

The step of header processor generates write commands addressed to the output step, depending on the programming and the value of the signal generated by the integrated circuit acting as a police.

In the extraction step, the cells destined to the local micro-processor are selected, storing then in the FIFO memory.

The processor knows the state of the FIFO memories and reads them, extracting the stored information.

The delay step carries out the appropiate delay in the flow, so that the cells converge on the output with the appropiate headers already processed.

The output step adapts the output signals so that, with a data flow and control signals, said signals can be readdressed towards the corresponding destinations.

The interface with the microprocessor allows the different operating modes of the circuit to be programmed, to read and write in the external RAM memories, to extract and insert cells, and to handle interrupts and reset the circuit.

The interface of external memories constitutes the interlocutor between the microprocessor and the external memories, such as the transfer memory of the integrated circuit acting as a police and the translation memory, allowing a programming in real time of both memories.

BRIEF DESCRIPTION OF THE DRAWINGS

In order to complement this description and to aid to a better understanding of the features of the invention, the accompanying drawings, which are a part of this specification, show in an illustrative but non limitative sense, the following:

The sole FIGURE shows a block diagram of the translator chip or integrated circuit for a wideband network, wherein the functional blocks thereof are shown.

DETAILED DESCRIPTION OF A PREFERRED EMBODIMENT

From the sole figure, it can be seen that the translator chip or integrated circuit for a wideband network of the invention is constituted in such a manner that it is qualified to transform the format restored by the information cell CCITT, into other—prearranged format by inserting the cells from a microprocessor into the data flow in asynchronous transfer mode, and it extracts from this flow the cells addressed to the microprocessor.

Moreover, the translator chip or integrated circuit for a wide-band network checks and generates a control by cyclic redundancy of the cells indicated to it.

In order to perform its functions, an integration of the circuit with the following functional modules has been arranged, namely:

Input step (1).
Detector of empty cells and filter identifying the terminator element of output interface (2) (IES).
Step of control calculus by cyclic redundancy (3).
Extractor of the page address (4).
Header processor (5).
Delay step (18).
Output step (6).
Interface with microprocessor (7).
Insert step (8).
Interface of external memories (9).
Extraction step (10).

The first seven mentioned modules (1), (2), (3), (4), (5), (18), and (6)), act fundamentally on the data flow (11), in asynchronous transfer mode crossing it, while the last four modules (7), (8), (9) and (10) perform interface functions with the micro-processor (12), and with the external translation memories (13) and memories of the integrated circuit acting as a police (14).

The function of the input step (1) is to convert the format of the cell from a restored state to that required by the wideband network, and for it, it adds to the cell header a new field, so-called label, which does not bear any significant information in this step, since this information will be added in later steps of the circuit.

If the data flow is delivered to the input step (1) in the format required by the network, no changes in the cell will be introduced in this step.

The frequency adaptation is produced in this input step, by multiplexing the input signals (11), and since each one has its own clock signals, cell synchronism and signal of empty cell, adapting this information to generate a sole output signal (15) including all the incoming signals.

The detection step (2) of empty cells and filter (IES) (output port identifier) detects the empty cells existing in the data flow in asynchronous transfer modo received from the preceding step (1), eliminating those cells not bearing in their heading the value of the identifier of terminator element of the output interface (IES) expected.

Empty cells means those cells having the ITV (Identifier of Virtual Route) and ICV (Identifier of Virtual Channel) fields void, as defined by CCITT in the standard format of cell. In front of this case, the detector of empty cells (2) activates the empty cell signal.

The insert step (8) inserts cells from the microprocessor (12) into the existing voids in the data flow in asynchronous transfer mode, coming from the detecting step of empty cells (2).

The cells to be inserted are stored in an internal FIFO memory (16), waiting for the command from the microprocessor (12), which is produced when an empty cell is detected.

The extractor (4) of page address and circuits reserved obtains the main part of the access address to the external RAM memories (13), and for it, it has an extraction mask composed of an asembly of registers starting from which the information corresponding to the base address is obtained. This step distinguishes between cells exclusively addressed to the microprocessor (12) and cells which are not, it being not necessary to modify the header when the cells go exclusively to the microprocessor.

The module of control calculus (3) by cyclic redundancy generates or checks the control by cyclic redundancy of the cells indicated in the appropiate programming, and in the case of cells coming from the microprocessor (12), each time that the control by cyclic redundancy is generated, and in those addressed thereto, is always checked.

The header processor (5) modifies the heading of the cell, by assigning it new labels in accordance with the read performed by the translation RAM memory (13).

The step of header processor (5) generates write commands addressed to the output step, depending on the programming and the value of the signal generated by the integrated circuit acting as a police (14).

In the extraction step (10), the cells destined to the local microprocessor (12) are selected, storing them in a FIFO memory (17), and the processor knows the state of these memories, proceding to read them and to extract the stored information.

The delay step (18) carries out the appropiate delay in the flow, so that the cells converge, at the output, with the appropiate headers already processed.

The output step (6) adapts the output signals (15) according to that specified in the output interface of the device, by enabling or not the indication of empty cell. In this way, with a sole data flow and control signals, the output can be readdressed towards the relative destinations.

The interface (7) with the microprocessor (12) allows the different operating modes of the circuit to be programmed, to read and write in the external RAM memories (13), to extract and insert cells, and to handle interrupts and reset the circuit.

The interface (9) of external memories constitutes a support for the external memories, such as the transfer memory of the integrated circuit acting as a police (14), and the translation memory (13), and it allows also a progremmming in real time of both memories.

It is not considered necessary to extend more this description for an expert in the art to understand the scope of the invention and the advantages derived from it.

The materials, shape, size and arrangements of the components are open to variation, provided that it does not imply any alteration to the essence of the invention.

The terms under which this specification has been described should be always taken in an ample and non limitative sense.

We claim:

1. A translator for use in an element of a wideband network, for transforming a format restored by a CCITT information cell into other predetermined formats by inserting cells from a microprocessor into network data flow in asynchronous transfer mode (ATM) and by extracting from the network data flow cells addressed to the microprocessor, the translator comprising the following cooperatively interconnected elements:

input means for receiving input data cells from the network data flow and for modifying a header of cells in the input data so as to adapt them to perform functions in the ATM layer;

means for detecting empty cells and for identifying an output port;

control calculus means for carrying out cyclic redundancy check (CRC) operations;

means for extracting addresses related to external memories that permit modification of the cell headers;

a header processor for modifying the cell headers in accordance with information stored in the external memories;

a delay means for delaying the data flow so that the cells converge with cell headers that have been processed by the header processor;

an interface with the microprocessor;

an insertion means for inserting cells from the microprocessor into the data flow;

an interface with the external memories;

an extracting means for extracting cells addressed to the microprocessor; and an output means for providing an output data flow to the network.

2. The translator of claim 1, wherein:

the header processor, in collaboration with the external memories, performs a translation of the cell headers in accordance with programming indicated for the network element in the network data flow in asynchronous transfer mode at up to 800 Mbits per second.

3. The translator of claim 1, wherein:

the input means includes means for multiplexing asynchronous flow of user cells;

the insertion means includes means for multiplexing control cells; and the translator, using the respective multiplexing means of the input means and of the insertion means, thus can process a single data flow.

4. The translator of claim 1, wherein:

the control calculus means includes means for detecting transmission errors.

5. The translator of claim 1 wherein:

the insertion means and the extracton means perform an insertion or extraction of cells addressed to or coming from the microprocessor.

6. The translator of claim 1, wherein:

the output means provides a data flow and corresponding control signals, which are capable of being re-addressed to appropriate destinations.

7. The translator of claim 7, wherein:

the translator is formed as an integrated circuit which constitutes an interface between the network and the microprocessor, and which configures and manages asynchronous transfer mode multiplexer functions.

8. The translator of claim 7, wherein:

the header processor, in collaboration with the external memories, performs a translation of the cell headers in accordance with programming indicated for the network element in the network data flow in asynchronous transfer mode at up to 800 Mbits per second.

9. The translator of claim 7, wherein:

the input means includes means for multiplexing asynchronous flow of user cells;

the insertion means includes means for multiplexing control cells; and the translator, using the respective multiplexing means of the input means and of the insertion means, thus can process a single data flow.

10. The translator of claim 7, wherein:

the control calculus means includes means for detecting transmission errors.

11. The translator of claim 7, wherein:

the insertion means and the extraction means perform an insertion or extraction of cells addressed to or coming from the microprocessor.

12. The translator of claim 7, wherein:

the output means provides a data flow and corresponding control signals, which are capable of being re-addressed to appropriate destinations.

* * * * *